United States Patent [19]

Marelin

[11] Patent Number: 5,129,350
[45] Date of Patent: Jul. 14, 1992

[54] TENSION INDICATING DEVICE FOR USE WITH A BANDING TOOL

[75] Inventor: Miklos B. Marelin, Denver, Colo.

[73] Assignee: Band-It-Idex, Inc., Denver, Colo.

[21] Appl. No.: 756,044

[22] Filed: Sep. 6, 1991

[51] Int. Cl.⁵ ............................................. G01D 5/04
[52] U.S. Cl. ........................ 116/282; 116/DIG. 34; 140/93.2; 81/9.3
[58] Field of Search ........ 116/230, 281, 282, DIG.34, 116/DIG. 11, 212; 81/9.3; 140/93.2, 93.4, 123.5; 73/862.38, 862.39, 862.42

[56] References Cited

U.S. PATENT DOCUMENTS

| | | | |
|---|---|---|---|
| D. 123,270 | 10/1940 | Mahn | 81/9.3 |
| 1,330,705 | 2/1920 | Herrick | 73/862.42 |
| 2,115,736 | 5/1938 | McAneny | 81/9.3 |
| 2,208,114 | 7/1940 | Campbell | 81/9.3 |
| 2,837,494 | 6/1958 | Lodholm | 81/9.3 |
| 3,067,640 | 12/1962 | Lodholm | 81/9.3 |
| 3,261,062 | 7/1966 | Scarborough, Jr. | 81/9.3 |
| 3,596,686 | 8/1971 | Blumenfeld et al. | 81/9.3 |
| 3,735,784 | 5/1973 | Obuch et al. | 140/93.2 |
| 4,390,047 | 6/1983 | Kaneko | 140/93.2 |
| 4,747,433 | 5/1988 | Dixon | 140/150 |
| 4,928,738 | 5/1990 | Marelin et al. | 140/93.4 |

FOREIGN PATENT DOCUMENTS

0663995 1/1988 Switzerland .................. 81/9.3

Primary Examiner—William A. Cuchlinski, Jr.
Assistant Examiner—John L. Beres
Attorney, Agent, or Firm—Sheridan Ross & McIntosh

[57] ABSTRACT

Apparatus and method are provided for indicating when a predetermined amount of tension has been applied to a band by a banding tool. The apparatus includes a housing, a lever for transferring pressure, and a tension indicator. As a tool handle is rotated to apply tension to a band, pressure is applied to the lever. When the tension applied is substantially equal to the predetermined tension, the lever pivots and activates the indicator, indicating to the operator of the banding tool that sufficient tension has been applied. In one embodiment, the indicator extends into the path of the rotating tool handle, thus preventing the operator from applying further tension to the band.

27 Claims, 5 Drawing Sheets

TENSION INDICATING DEVICE FOR USE WITH A BANDING TOOL

TECHNICAL FIELD OF THE INVENTION

This invention relates in general to banding tools, and in particular to a method and apparatus for indicating when sufficient tension has been applied by a banding tool to a band.

BACKGROUND OF THE INVENTION

Banding tools are well known in the art for applying tension to a band around items, such as hoses, pipes, conduit and the like, to be connected or held together. A typical band includes a length of strap, generally metal, wrapped around the item and having a buckle to connect and hold together the two ends of the strap.

It can be appreciated that the band should be fastened with sufficient tension to ensure that the band remains in place, that the items remain connected to each other and that any gas or liquid flowing through the items not leak out. However, it can also be appreciated that if too much tension is applied to the band, the items around which the band is wrapped can crack, buckle or break. It is also possible for the band itself to break, creating a significant safety hazard to the operator of the banding tool.

With respect to power-activated band tensioning tools, it is common to monitor pressure, such as air pressure. When the air pressure reaches a predetermined pressure, the application of power, via the air pressure, is discontinued. The band then has a predetermined amount of tension. Regarding manually operated band tensioning tools, U.S. Pat. No. 4,928,738 issued May 29, 1990, entitled "Tool For Tightening Cable Tie" and assigned to the same assignee as the present invention, discloses a method and apparatus for tightening band-type clamps, such as cable ties, in a desired tension. The free end of the band is inserted in the nose of the device and under a pinching roller; a handle is then squeezed toward the body of the device compressing a first spring against a bridge member to cause the bridge member to move rearward in the body of the device and compress a second spring. The pinching roller, connected to the bridge member, also moves rearward, thereby applying tension to the band. When the forces produced by the second spring and the tension in the band against the bridge member in the forward direction exceed the force applied by the first spring against the bridge member in the rearward direction, the bridge member ceases to move rearward. Further squeezing of the handle continues to compress the first spring and causes the handle to collapse against the body of the device, indicating that sufficient tension has been applied to the band. A second handle is then squeezed to cut the band. The amount of tension applied can be changed by replacing the second spring with a spring having a different compression characteristic.

Another indicator assembly is disclosed in U.S. Pat. No. 4,747,433 issued May 31, 1988 and entitled "Clamp Tightening Tool." This patent discloses a pneumatic powered device for tightening a metal band around a hose. The free end of the band is wrapped around the hose, passed through a buckle and inserted into the nose of the device. A trigger is then squeezed. A V-shaped punch pivots and rams part of the free end of the band into a V-shaped throat formed in an anvil. The punch and anvil are shifted in a direction to apply tension to the band. When the tension applied to the band reaches about 500 pounds, the end of the band breaks away from between the punch and anvil and slips out of the throat. A frosted appearance on the outer surface of the end of the band indicates that adequate tension has been applied.

However, many manual banding tools do not include an indicator. For example, one such banding tool, typical in design and operation, comprises a C-shaped frame. The frame has a nose piece having a slot for receiving the tail (or free end) of the band; the nose piece can also include a lever actuated cutting blade. Opposite the nose piece is an end piece having a bore through which a threaded rod is inserted, the respective diameters of the rod and the bore being selected to permit the rod to move freely through the opening. A clamping member is secured to the end of the rod which is within the frame (that is, between the end piece and the nose piece). The clamping member can slide along the base of the frame when the rod moves back and forth through the bore in the end piece. A handle is threaded onto the end of the rod outside the frame and is free to rotate without causing the rod to rotate.

In use, a buckle is secured to one end of a band and the band wrapped around the items to be connected. The free end of the band is passed through the buckle but is not fastened thereto. The nose of the banding tool is pressed against the buckle and the tail of the band passed through the slot in the nose of the banding tool. The tail is then secured to the clamping member, such as with a lever actuated eccentric cam.

The threaded handle is screwed onto the threaded rod until it contacts the outside of the end piece of the frame. Continued turning of the handle pulls the clamping member, with the band secured thereto, toward the end piece, thereby applying tension to the band. When sufficient tension has been applied to the band, the buckle is fastened to the band and a lever is operated to cut the tail of the band near the nose. The tail is released from the clamping member and the banding tool is ready to apply another band.

Unless the handle is turned enough, insufficient tension will be applied to the band; however, if the handle is turned too much, excess tension will be applied. Operators of the banding tool typically stop turning the handle when the handle "feels about right" or the band "looks about right". Because bands applied to different items (having different sizes, strengths, thicknesses and materials) require different amounts of tension to ensure a satisfactory connection, inexperienced operators of the banding tool may not be able to properly apply bands. Even experienced operators may not be able to consistently apply the proper tension in all applications. As previously mentioned, a fundamental concern is the risk that the band will snap and injure the operator if excess tension is applied.

Consequently, a need has arisen for an apparatus for use with a banding tool to indicate to the operator when sufficient tension has been applied to the band.

SUMMARY OF THE INVENTION

The present invention disclosed herein comprises a method and apparatus for indicating when a desired amount of tension has been applied to a band by a banding tool. The device is adapted for use with existing banding tools, or could be incorporated into future banding tool designs, can be provided with an adjusting apparatus to establish the magnitude of tension at which it will be activated and is easy to use.

The device comprises a housing having a bore through which the threaded rod of the banding tool extends. When the device is in place, the housing is disposed against the outside of the end piece of the tool frame and the bore in the housing is in substantial linear alignment with the bore through the end piece to enable the threaded rod to extend through both openings. The device also includes a lever pivotally secured to the housing for transferring a pressure applied by the handle thereto. The lever has a bore, in substantial linear alignment with the bores through the housing and the end piece of the tool frame, through which the threaded rod extends. The device also includes an indicator, responsive to a pivoting movement of the lever, for indicating when the desired tension has been applied to the band. In one aspect of the present invention, the indicator can also prevent the operator of the banding tool from rotating the handle after the desired tension has been reached.

The device can also include an adjusting apparatus to establish the level of tension at which the indicator will be activated. The adjusting apparatus preferably includes a force storing device, such as a spring, within a recess in the housing to bias the lever against the tool handle, thereby opposing the pressure applied by the handle to the lever.

In use, the tool handle is unthreaded from the rod of the banding tool and the present invention moved along the rod until it contacts the outside of the end piece of the frame. The handle is rethreaded onto the rod and the adjustable spring is set so that the indicator will be actuated when the desired tension has been applied to the band. The banding tool is then operated in the conventional fashion. When the desired amount of tension has been applied to the band, the indicator is actuated indicating to the operator that no additional tension should be applied. The indicator also prevents the tool handle from being turned any further preventing the operator from accidentally applying excess tension.

It is a technical advantage of the present invention that an indicator is provided for informing an operator when sufficient tension has been applied to a band by a banding tool. It is a further technical advantage that the present invention is easy to use and can be employed with existing banding tools or incorporated into later designs. It is still a further technical advantage that the present invention can substantially reduce the risk of excess tension causing a band to break and injure the operator.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
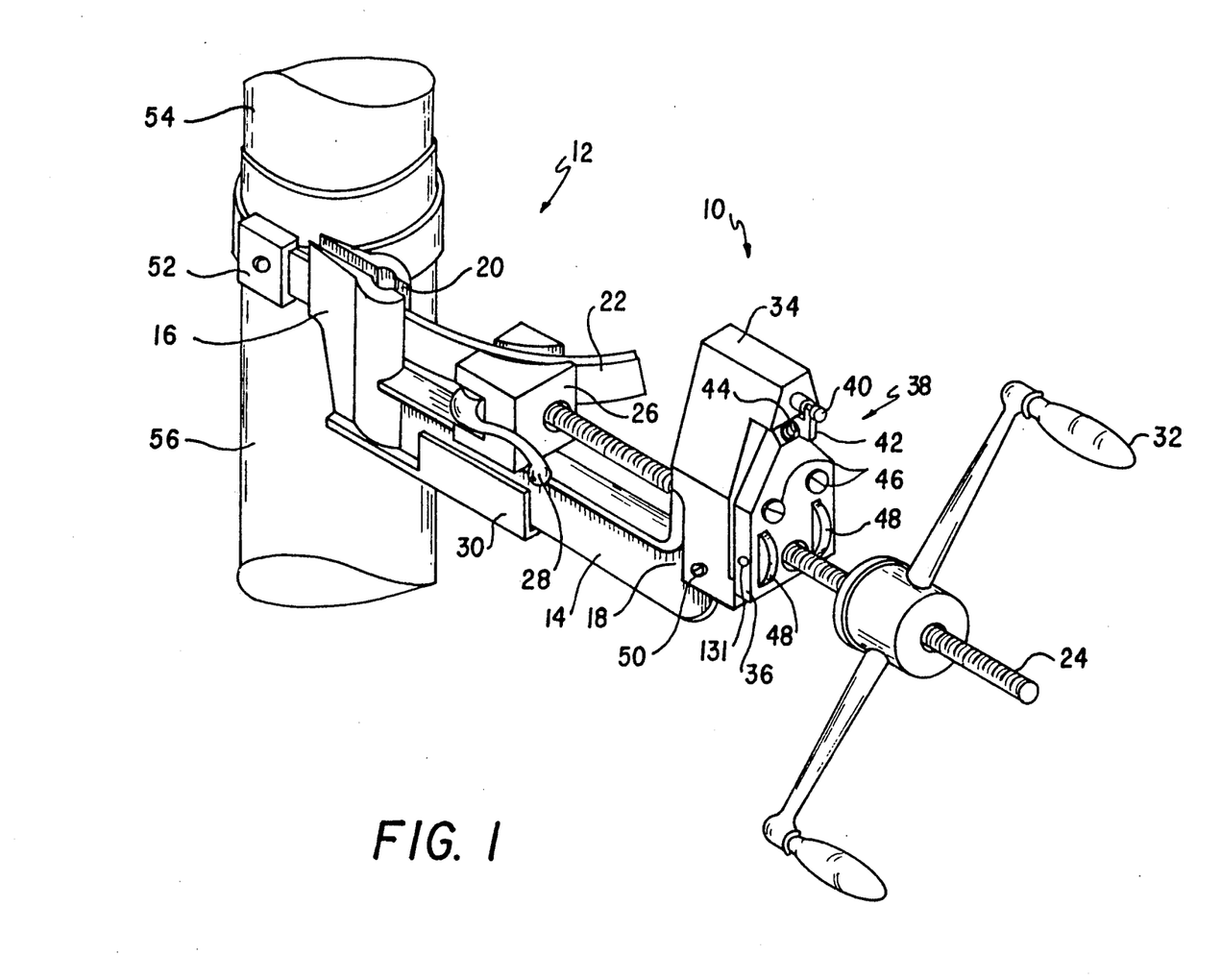
FIG. 1 is a perspective view of the tension indicating device of the present invention shown in conjunction with a banding tool.

FIG. 1 illustrates a tension indicating device 10 of the present invention positioned on a typical banding tool 12. The banding tool 12 includes a generally C-shaped frame 14 with a nose piece 16 and an end piece 18 opposite thereto. The nose piece 16 has a slot 20 for receiving a band 22. The end piece 18 has a bore (not shown) for receiving a threaded rod 24 therethrough. Secured to the end of rod 24 which is positioned between nose piece 16 and end piece 18 is a clamping member 26 for holding band 22 while tension is applied. An eccentric cam, or similar means, located within clamping member 26, is activated by a lever 28 to hold band 22 in place. Nose piece 16 typically includes a cutting blade (not shown) which is operated by another lever 30 for severing excess band material. A handle 32 is threaded onto the rod 24 outside the frame 14.

The tension indicating device 10 includes a housing 34, a lever 36 for transferring pressure and an indicator assembly 38 for indicating when sufficient tension has been applied to the band 22. The indicator assembly 38 includes an indicating rod 40 and a locking arm 42 for restraining the indicating rod 40 when the tension applied to the band 22 is less than the desired tension. The locking arm 42 is urged against the indicating rod 40 by a spring 44 positioned between lever 36 and locking arm 42.

The lever 36 is secured to the housing 34 by hold-down bolts 46. Bores through the lever 36 to receive hold-down bolts 46 are not threaded and, thus, the lever 36 is allowed some degree of movement relative to the housing 34. Rollers 48 in lever 36, rotating on axles 131, permit the tool handle 32 to rotate freely when in contact therewith and to apply pressure to the lever 36. Set screws 50, only one of which is visible in FIG. 1, on opposite sides of the housing 34 secure housing 34 to the end piece 18.

In use, the tension indicating device 10 is secured to the frame 14 by unscrewing the tool handle 32 from the rod 24 and inserting the rod 24 through bores in the tension indicating device 10. Tension indicating device 10 is moved along rod 24 until it abuts the end piece 18 of the frame 14. Set screws 50 are then tightened to secure the tension indicating device 10 in place. The tool handle 32 is threaded back onto the rod 24. A buckle 52 is secured to one end of the band 22 and the free end of the band 22 is wrapped around the items to be connected or held together, such as pipes 54 and 56. The free end of the band 22 is passed through the buckle 52, but without securing it thereto, and then passed through the slot 20 in the nose piece 16. The nose piece 16 is positioned against the buckle 52 and the free end of the band 22 is secured within the clamping member 26.

The tool handle 32 is rotated around rod 24, for example, in a clockwise direction, so that it moves toward tension indicating device 10. As the operator continues to turn the tool handle 32, the tool handle 32 applies pressure to the lever 36 and pulls the clamping member 26, with the band 22 secured therein, toward the tension indicating device 10, thereby applying tension to the band 22. When a predetermined amount of tension has been applied to the band 22, the lever 36 pivots toward the housing 34, causing the locking arm 42 to release the indicating rod 40. The indicating rod 40 then extends outwardly from the housing 34, indicating to the operator that sufficient tension has been applied.

Figure 2:
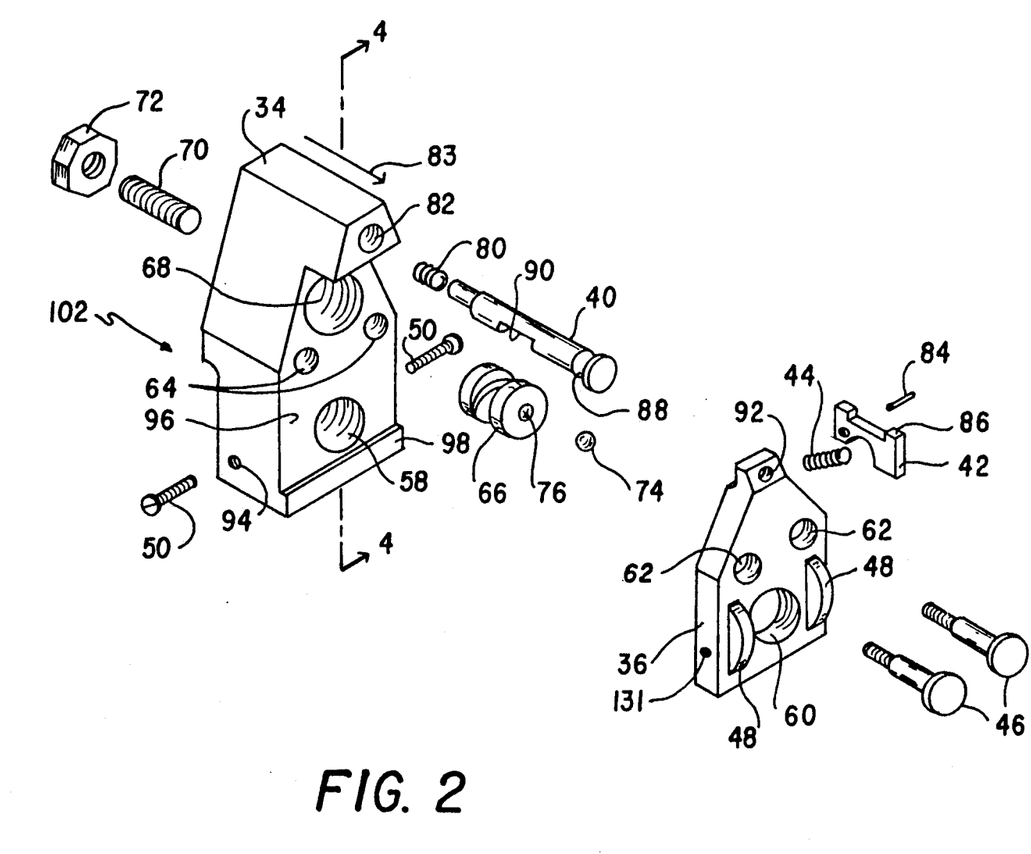
FIG. 2 is an exploded perspective view of the tension indicating device of the present invention.
Figure 3:
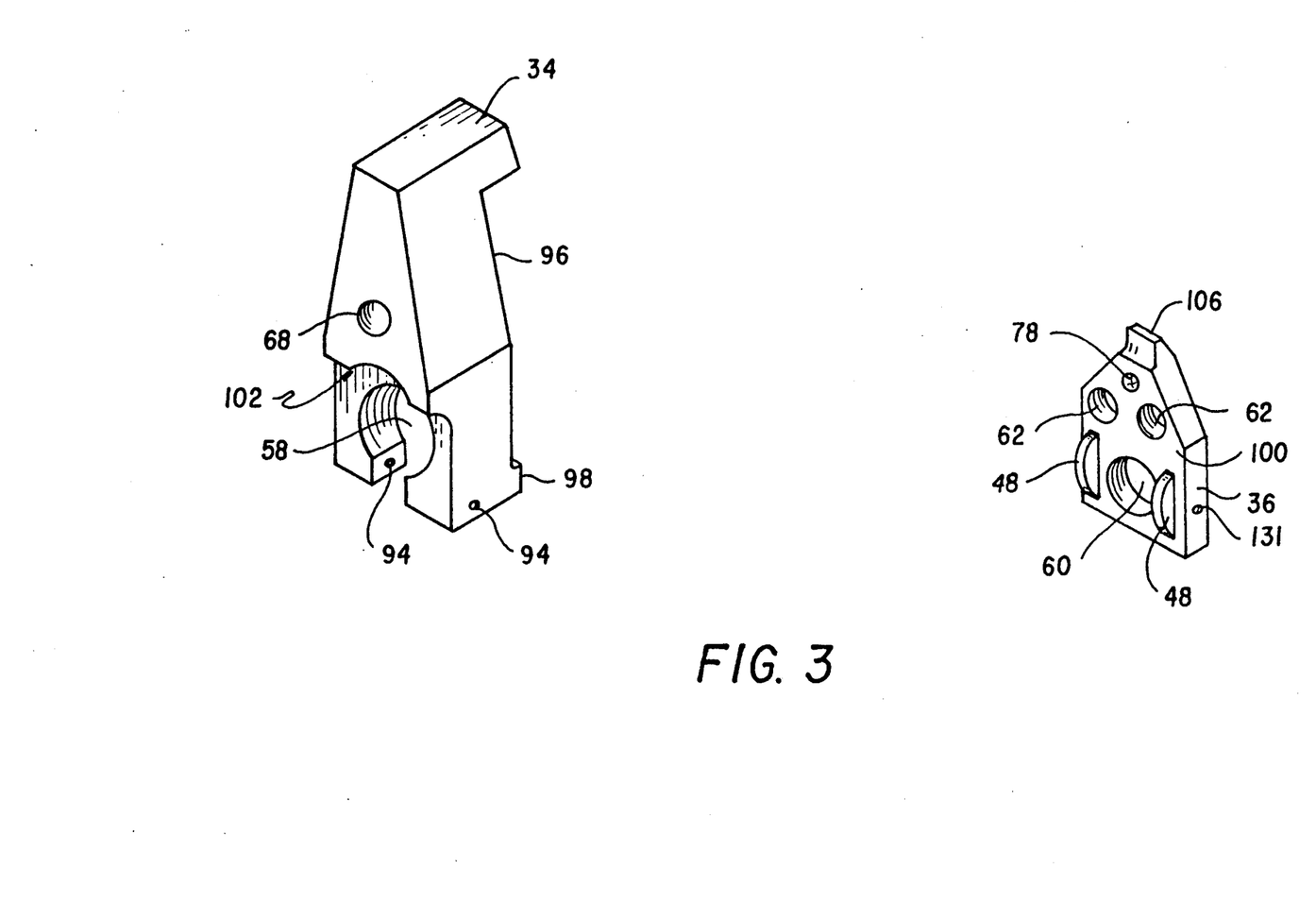
FIG. 3 is a perspective view of the housing and lever of the present invention showing portions not visible in FIGS. 1 and 2.

FIG. 2, an exploded perspective view of the tension indicating device 10, and FIG. 3, a perspective view of surfaces of the housing 34 and the lever 36 which are not visible in FIGS. 1 and 2, illustrate the construction of the tension indicating device 10. Housing 34 has a bore 58 formed therethrough and lever 36 has a bore 60 formed therethrough in substantial linear alignment with bore 58 to enable the tension indicating device 10 to be positioned over the threaded rod 24. Hold-down bolts 46 are disposed through openings 62 in lever 36 and engage threaded openings 64 in the housing 34 to secure the lever 36 to the housing 34. Openings 62 in lever 36 are not threaded and enable lever 36 to have some degree of movement relative to the hold-down bolts 4 and the housing 34.

A coil spring 66 is inserted through one end of a bore 68 in the housing 34 and an adjusting bolt 70 is screwed into an opposing end of the bore 68 for adjusting the precompression on the spring 66. A locking nut 72 is threaded onto the adjusting bolt 70 to prevent the pressure on the spring 66 from accidentally changing after it has been set. A ball bearing 74 is interposed between a concave depression 76 in one end of the spring 66 and a corresponding concave depression 78 in the lever 36 (as shown in FIG. 3).

A spring 80 is disposed within another bore 82 in the housing 34. The indicating rod 40 is inserted into the bore 82 and is biased outwardly, in a direction indicated by an arrow 83, by the spring 80. The locking arm 42 is pivotally secured to the housing 34 with a pin 84. The locking arm 42 has a finger 86 which engages a first notch 88 in the indicating rod 40 when the tension applied to the band 22 is less than the desired tension and engages a second notch 90 to keep the indicating rod 40 from being released completely from the bore 82 when the tension applied to the band 22 is substantially equal to the desired tension. The locking arm 42 is biased against the indicating rod 40 by the spring 44, one end of which is disposed in a recess 92 in the lever 36 and the other end of which is disposed in a corresponding recess in the locking arm 42.

A recess 102 in the housing 34 permits the housing 34 to fit over the end piece 18 of the banding tool 12. The set screws 50 screw into threaded openings 94 in the housing 34 to secure the tension indicating device 10 to the end piece 18 of the banding tool 12.

Housing 34 includes first and second surfaces 96 and 98 which face a surface 100 (see FIG. 3) of lever 36. When the tension indicating device 10 is assembled, the second surface 98 of housing 34 is in substantial planar contact with a portion of surface 100 of lever 36 and the first surface 96 of housing 34 is substantially parallel to, and spaced from, another portion of the surface 100 of lever 36.

Figure 4:
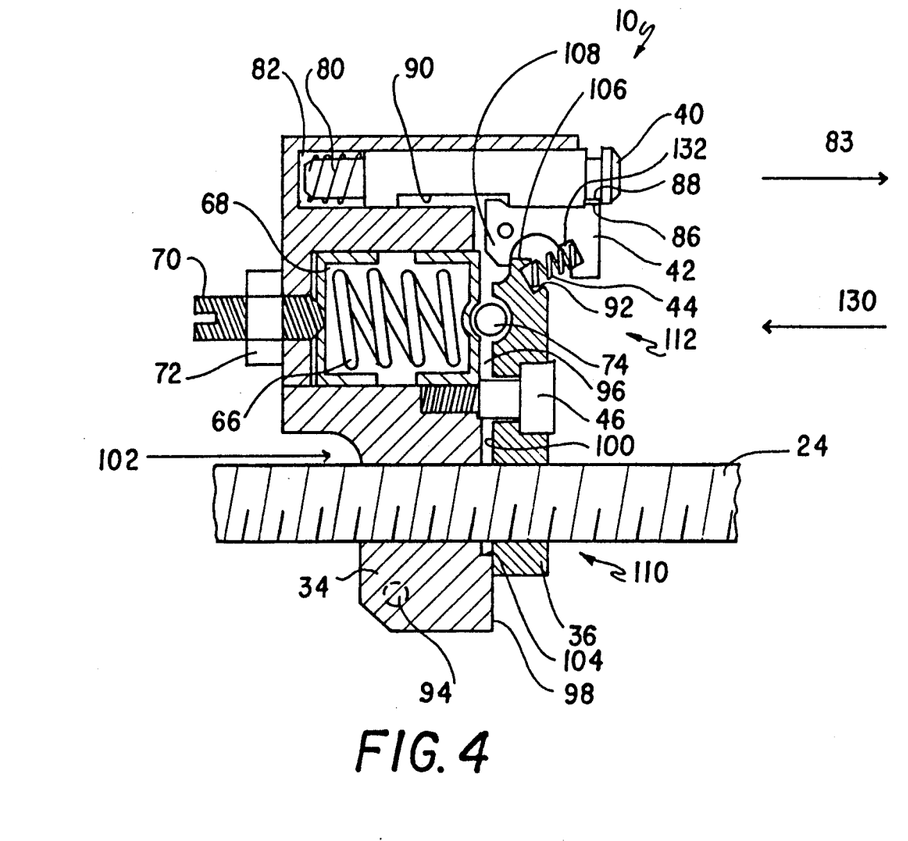
FIG. 4 is a cross-sectional view of the tension indicating device of the present invention.

Reference is now made to FIG. 4 which is a cross-sectional view of the tension indicating device 10 taken along line 4—4 of FIG. 2. In operation, the adjusting bolt 70 is turned clockwise or counterclockwise to increase or decrease, respectively, the compression in spring 66, thereby increasing or decreasing the amount of tension desired in the band 22. The adjustment can be made in a workshop at the beginning of a work day before the operator of the banding tool 12 goes out to the job site. A measuring device in the shop can be used to insure that the desired amount of tension will be applied, taking into account the size, strength, thickness and material of the items to be connected together. If desired, the adjusting bolt 70 can be provided with a slot or recess requiring a special tool to make the adjustment. Thus, tension adjustment can be restricted to the shop and operators of the banding tool 12 can be prevented from increasing or decreasing the setting thereto. Alternatively, tension indicating device 10 can include a calibrated indicator so that tension could be adjusted accurately by the operator on the job. The operator could thus make quick tension adjustments to take into account various factors related to the job to be completed.

Once the tension has been set, the locking nut 72 is tightened against the housing 34 to keep the adjusting bolt 70 from loosening. The tension indicating device 10 is secured to the banding tool 12 in the manner described with reference to FIG. 1. As the tool handle 32 is rotated to pull the clamping member 26 toward the tension indicating device 10, the tool handle 32 applies pressure to rollers 48 which serve as a pressure contact area on the lever 36 adjacent the handle 32. Such pressure is transferred toward a section 112 of the lever 36 distal the rollers 48. The transferred pressure, reduced in magnitude due to the distance along the lever 36 from the rollers 48, is applied to the ball bearing 74 in a direction toward housing 34 indicated by an arrow 130. Spring 66 exerts an opposing, and stronger, pressure against ball bearing 74, thereby keeping the section 112 of the lever arm 36 from pivoting toward the housing 34.

The indicating rod 40 is urged outwardly in the direction 83 from the bore 82 in the housing 34 by the spring 80. However, the finger 86 of the locking arm 42 is engaged with the first notch 88 of the indicating rod 40, thereby keeping the indicating rod 40 from moving in the direction 83. The locking arm 42 is urged toward the indicating rod 40 by the spring 44 disposed between a recess 132 in the locking arm 42 and the corresponding recess 92 in the section 112 of the lever 36.

When the pressure exerted by the lever arm 36 against the bearing 74 exceeds the opposing pressure exerted by the spring 66 against the bearing 74, indicating that the desired amount of tension has been applied to the band 22, the section 112 of the lever 36 pivots toward the surface 96 of the housing 34. A fulcrum 104 serves as the pivot point for the pivoting movement of the lever 36 and is located at the corner of the second surface 98 of the housing 34 where the second surface 98 ends and the first surface 96 begins.

As the lever 36 pivots toward the housing 34, a nose 106 of the lever 36 presses against a corresponding nose 108 of locking arm 42. Consequently, the finger 86 of the locking arm 42 pivots away from the notch 88 in the indicating rod 40, thereby releasing the indicating rod 40 and allowing it to extend outwardly in the direction 83 from bore 82 and indicate to the operator that the desired amount of tension in the band 22 has been achieved. Finger 86 engages second the notch 90 to keep the indicating rod 40 from being completely released from the bore 82.

Figure 5:
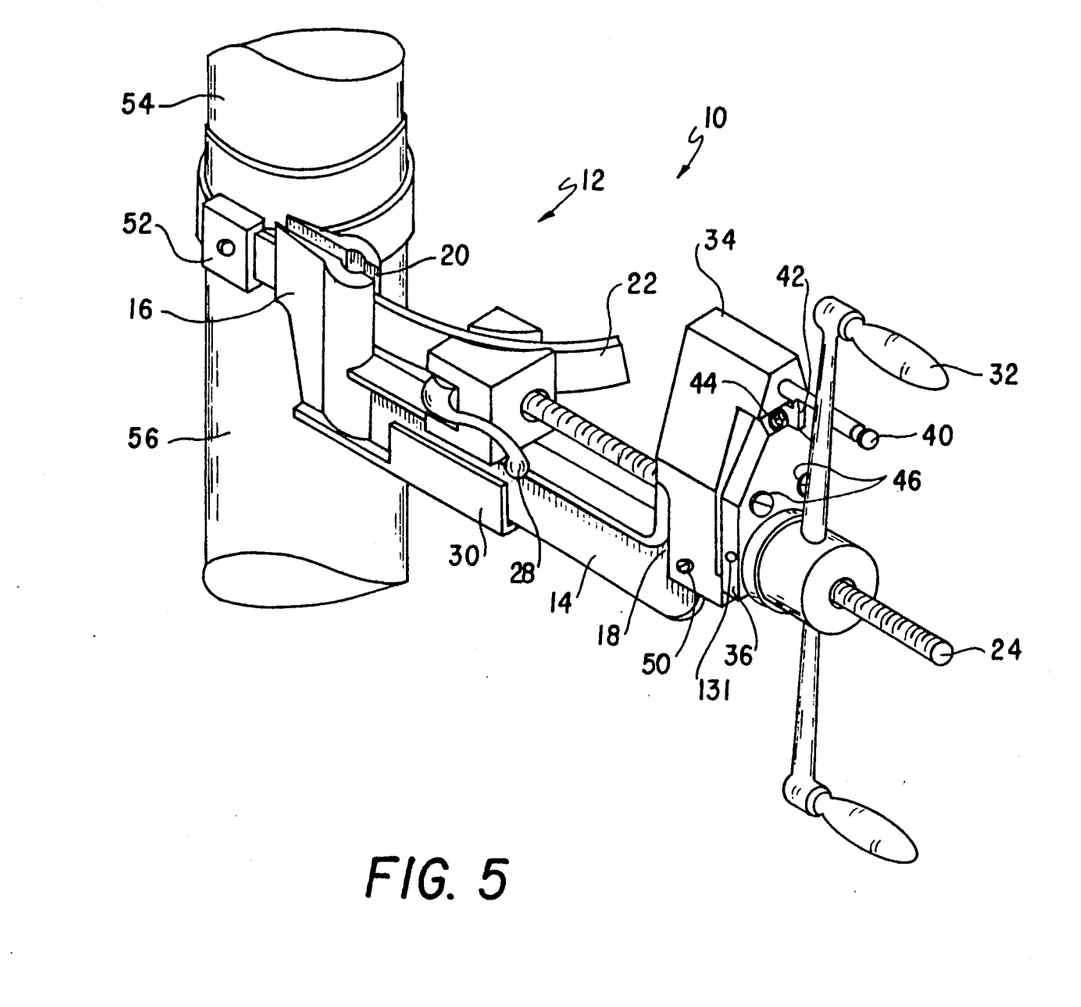
FIG. 5 is a perspective view of the tension indicating device of the present invention shown in conjunction with a banding tool and with the indicating means in the activated position.

As illustrated in FIG. 5, the indicating rod 40 can extend a sufficient distance from the housing 34 to block further rotation of the tool handle 32. The operator is thus prevented from accidentally applying further tension to band 22. In some situations, however, it may be desirable to apply additional tension. If so, the operator can push and hold the indicating rod 40 back into the bore 82 to allow further rotation of the tool handle 32. It will be appreciated that such action on the part of the operator must be deliberate and cannot occur unintentionally.

After the free end of the band 22 has been cut by moving the cutting lever 30, the remaining portion of the band 22 can be released from the clamping member 26. The indicating rod 40 is then pushed back into the bore 82 until the finger 86 of the locking arm 42 engages the first notch 88 thereof. With little or no pressure being applied by the tool handle 32 to the lever 36, the spring 44 causes the finger 86 to remain engaged with the notch 88, thereby keeping the indicating rod 40 from extending outward from the bore 82 in the direction 83.

Although the present invention has been described in detail, it should be understood that various changes, substitutions, and alterations can be made herein without departing from the spirit and scope of the invention as defined by the claims set forth herein.

What is claimed is:

1. A tension indicating device for use with a banding tool of the type having a frame, a threaded rod, a band holding clamp on one end of the rod, and a rotating tool handle cooperating with the rod for applying tension to a band, the tension indicating device comprising:
   (a) a housing having a first bore for receiving the rod therethrough;
   (b) pressure transfer means, pivotably secured to said housing, for transferring a pressure applied by the tool handle thereto, said pressure corresponding to tension applied to the band; and
   (c) indicating means at least partially disposed within a first recess of said housing, responsive to a pivoting movement of said pressure transfer means, for indicating the application of a predetermined tension applied to the band.

2. The device of claim 1, wherein said pressure transfer means comprises:
   (a) a pressure contact area for contact with the tool handle; and
   (b) a surface facing said housing, said surface comprising:
      (i) a first face distal said pressure contact area; and
      (ii) a second face proximate said pressure contact area.

3. The device of claim 2, said housing further including:
   (a) a first surface; and
   (b) a second surface in a plane substantially parallel to and spaced from said first surface.

4. The device of claim 3, wherein:
   (a) said first face of said pressure transfer means is substantially parallel to said first surface of said housing and spaced therefrom and said second face of said pressure transfer means is substantially planar and in contact with said second surface of said housing when pressure applied to said pressure contact area is less than said predetermined tension; and
   (b) said first face of said pressure transfer means is at an oblique angle to said first surface of said housing when pressure which is applied to said pressure contact area is substantially equal to said predetermined tension, wherein said indicating means is activating.

5. The device of claim 1, wherein said indicating means includes:
   means for restricting rotational movement of the tool handle when pressure applied to said pressure transfer means is substantially equal to said predetermined tension.

6. The device of claim 1, wherein said indicating means comprises:
   (a) a rod within said first recess;
   (b) means for biasing said rod in a direction to contact the tool handle; and
   (c) means for restraining said rod against said means for biasing when pressure applied to said pressure transfer means is less than said predetermined tension.

7. The device of claim 6, wherein said means for biasing comprises a spring.

8. The device of claim 6, wherein said means for restraining comprises:
   a locking arm interconnected with said housing.

9. The device of claim 8, wherein said locking arm is pivotably attached to said housing and engagable with said pressure transfer means, wherein said locking arm permits said rod to move in said direction when pressure applied to said pressure contact area is substantially equal to said predetermined tension.

10. The device of claim 1, further comprising:
    means for adjusting said predetermined tension.

11. The device of claim 10, wherein said means for adjusting includes:
    a spring biasing a portion of said pressure transfer means away from said housing, wherein increasing compression on said spring increases said predetermined tension.

12. The device of claim 11, wherein said means for adjusting further includes:
    a ball bearing disposed between said spring and said pressure transfer means.

13. The device of claim 11, wherein said spring is disposed within a second recess in said housing.

14. The device of claim 1, further comprising:
    roller means disposed between said pressure transfer means and the tool handle for facilitating rotation of the tool handle.

15. A tension indicating device for use with a banding tool of the type having a frame, a threaded rod, a band holding clamp on one end of the rod, and a rotating tool handle cooperating with the rod for applying tension to a band, the tension indicating device comprising:
    (a) a housing comprising:
       (i) a first bore for receiving the rod therethrough;
       (ii) a first surface; and
       (iii) a second surface in a plane substantially parallel to and spaced from said first surface;
    (b) pressure transfer means, pivotably secured to said housing, for transferring a pressure applied by the tool handle thereto, said pressure corresponding to tension applied to the band, said pressure transfer means comprising:
       (i) a second bore for receiving the rod therethrough;
       (ii) a pressure contact area for contacting the tool handle;
       (iii) a first face distal said pressure contact area; and
       (iv) a second face proximate said pressure contact area;

(c) an indicating rod at least partially disposed within a recess of said housing for indicating the application of a predetermined tension applied to the band;

(d) a locking arm, pivotably secured to said housing and responsive to a pivoting movement of said pressure transfer means, for restraining said indicating rod when pressure applied to said pressure contact area is less than said predetermined tension and for permitting said indicating rod to extend outwardly from said recess when pressure applied to said pressure contact area is substantially equal to said predetermined tension; and (e) means for adjusting said predetermined tension.

16. The device of claim 15, wherein:

(a) said first face of said pressure transfer means is opposite and substantially parallel to said first surface of said housing and spaced therefrom and said second face of said pressure transfer means is opposite and substantially planar and in contact with said second surface of said housing when pressure applied to said pressure contact area is less than said predetermined tension; and (b) said first face of said pressure transfer means is at an oblique angle to said first surface of said housing when pressure which is applied to said pressure contact area is substantially equal to said predetermined tension, wherein said indicating means is activated.

17. The device of claim 15, wherein:

(a) said indicating rod has a first notch and a second notch; and (b) said locking arm has a finger engagable with said first notch when said indicating rod is restrained within said recess and engagable with said second notch is extended outwardly from said recess.

18. The device of claim 15, wherein said means for adjusting includes:

(a) a spring biasing said first face of said pressure transfer means away from said first surface of said housing; and (b) a ball bearing disposed between said adjustable spring and said first face of said pressure transfer means, wherein increasing compression on said spring increases said predetermined tension.

19. The device of claim 15, further including:

at least one roller disposed between said pressure transfer means and the tool handle for facilitating rotation of the tool handle.

20. A method for indicating when a predetermined tension has been applied to a band by a banding tool on which a tension indicating device has been secured, the method comprising the steps of:

(a) setting a tension adjusting bolt to the predetermined tension;

(b) clamping the band in a band holding clamp;

(c) applying tension to the band and pressure to the tension indicating device; and (d) releasing a tension indicating rod from a recess in the tension indicating device when the pressure applied to the tension indicating device is substantially equal to the predetermined tension.

21. The method of claim 20, wherein said step of applying pressure to the pressure indicating device includes the step of:

rotating a tool handle against a pressure contact area of a lever.

22. The method of claim 21, wherein said step of setting a tension adjusting bolt includes the step of:

applying compression to a spring to bias the lever to oppose the pressure applied by the tool handle.

23. The method of claim 21, wherein said step of releasing a tension indicating rod includes the step of:

pivoting one portion of the lever when the pressure applied to the lever by the tool handle is substantially equal to the predetermined tension.

24. The method of claim 23, wherein said step of releasing a tension indicating rod further includes the step of:

pivoting a locking arm having a finger engaged with a notch in the tension indicating rod, wherein the finger disengages from the notch.

25. The method of claim 24, wherein said step of releasing a tension indicating rod further includes the step of:

allowing a spring to urge the tension indicating rod outwardly from the recess.

26. The method of claim 21, wherein said step of releasing a tension indicating rod includes the step of:

restricting application of further tension to the band.

27. The method of claim 26, wherein said step of restricting includes the step of:

extending the tension indicating rod into the path of the tool handle.

* * * * *